United States Patent
Liu et al.

(10) Patent No.: US 10,092,849 B2
(45) Date of Patent: Oct. 9, 2018

(54) HOVER-CONTROL METHOD FOR MULTIROTOR UNMANNED AERIAL VEHICLE UPCAST AT ANY ANGLE TO TAKE OFF, COMPUTER PROGRAM PRODUCT USING THE SAME, AND MULTIROTOR UNMANNED AERIAL VEHICLE USING THE SAME

(71) Applicant: Wistron Corporation, New Taipei (TW)

(72) Inventors: Zhen-Te Liu, New Taipei (TW); Yu-Yen Chen, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 132 days.

(21) Appl. No.: 15/171,023

(22) Filed: Jun. 2, 2016

(65) Prior Publication Data
US 2017/0203851 A1    Jul. 20, 2017

(30) Foreign Application Priority Data
Jan. 18, 2016  (TW) ............................ 105101436 A

(51) Int. Cl.
A63H 27/00    (2006.01)

(52) U.S. Cl.
CPC ........ *A63H 27/12* (2013.01); *B64C 2201/027* (2013.01); *B64C 2201/042* (2013.01)

(58) Field of Classification Search
CPC .............. A63H 27/12; B64C 2201/027; B64C 2201/042
See application file for complete search history.

(56) References Cited

U.S. PATENT DOCUMENTS

| 2016/0122018 A1* | 5/2016 | Matsue ................. B64C 39/024 244/17.13 |
| 2017/0068252 A1* | 3/2017 | Yu ........................ G05D 1/0858 |

FOREIGN PATENT DOCUMENTS

CN          204017380 U       12/2014

\* cited by examiner

*Primary Examiner* — Yuen H Wong
(74) *Attorney, Agent, or Firm* — McClure, Qualey & Rodack, LLP

(57) ABSTRACT

A hover-control method for multirotor unmanned aerial vehicle (UAV) upcast at any angle to take off is applied to correct at least one tilt angle of the multirotor UAV by dual-feedback schemes. When any of the at least one tilt angle is greater than a corresponding angle limitation, an open feedback scheme is executed to drive a plurality of motors of the multirotor UAV until a predetermined condition is achieved. When all of the at least one tilt angle are not larger than the respective angle limitations, a negative feedback scheme is executed to drive the motors of the multirotor UAV until a hover condition is achieved.

33 Claims, 11 Drawing Sheets

HOVER-CONTROL METHOD FOR MULTIROTOR UNMANNED AERIAL VEHICLE UPCAST AT ANY ANGLE TO TAKE OFF, COMPUTER PROGRAM PRODUCT USING THE SAME, AND MULTIROTOR UNMANNED AERIAL VEHICLE USING THE SAME

CROSS-REFERENCES TO RELATED APPLICATIONS

This non-provisional application claims priority under 35 U.S.C. § 119(a) on Patent Application No. 105101436 filed in Taiwan, R.O.C. on 2016/01/18, the entire contents of which are hereby incorporated by reference.

BACKGROUND

Technical Field

The instant disclosure relates to an unmanned aerial vehicle (UAV), and particularly relates to a hover-control method for multirotor UAV upcast at any angle to take off, a computer program product using the same, and a multirotor UAV using the same.

Related Art

Unmanned aerial vehicles (UAVs) are aerial vehicles without pilots thereon, and the UAVs are remote controlled or automatically controlled and are for executing certain tasks. Particularly, a multirotor UAV having two or more rotor shafts can be controlled in an easier, more stable, and more convenient manner. In addition, it can be widely used in various aspects, such as aerial shots, following shots, fishing bait release for ocean, and so on.

Commonly, the take off of the multirotor UAV is controlled by a remote controller so that the multirotor UAV can hover in air to execute certain tasks. However, using the remote controller to control the multirotor UAV is difficult, and only experienced users can use the remote controller fluently to control the multirotor UAV. In addition, the multirotor UAV can hover in air by being upcast, so that the multirotor UAV can execute certain tasks. Nevertheless, the conventional multirotor UAV is unable to hover in the air in response to any kind of upcasting. Specially, if the UAV is upcast at a sharp angle, the motors of the multirotor UAV would fail to converge and lead the multirotor UAV to be out of control. Consequently, to allow the multirotor UAV to take off and hover in air stably, the user can only upcast the multirotor UAV with a horizontal orientation but not a vertical orientation.

SUMMARY

In one embodiment, a hover-control method for multirotor unmanned aerial vehicle (UAV) upcast at any angle to take off is applicable to a multirotor UAV. The hover-control method includes: sensing an upcast state of the multirotor UAV by an inertia sensing unit; sensing a tilt angle of at least one shaft of the multirotor UAV at a highest position by the inertia sensing unit when the multirotor UAV is in the upcast state; and executing an open feedback scheme according to the tilt angle to make the UAV hover. In some embodiments, each tilt angle is compared with a threshold angle. A plurality of motors of the multirotor UAV are drove by a negative feedback scheme to converge the at least one tilt angle when all of the at least one tilt angle are not greater than the respective angle limitations. The motors of the multirotor UAV are drove by an open feedback scheme when any tilt angle is greater than the corresponding angle limitation, and the open feedback scheme is switch to the negative feedback scheme to drive the motors of the multirotor UAV to converge the tilt angle when the open feedback scheme achieves a predetermined condition.

In one embodiment, a computer program product includes at least one program instruction stored in a computer readable medium. The program instruction is loaded and executed by a multirotor UAV, to cause the multirotor UAV to implement the aforementioned hover-control method for multirotor UAV upcast at any angle to take off.

In one embodiment, a multirotor UAV upcast at any angle to take off includes a plurality of motors, a plurality of electronic speed controllers, an inertia sensing unit, and a processing unit. The electronic speed controllers are coupled to the motors. The electronic speed controllers drive the motors according to a plurality of driving signals. The inertia sensing unit measures an acceleration speed and an angular speed. The processing unit is coupled to the electronic speed controllers and the inertia sensing unit. The processing unit determines if the multirotor UAV is in an upcast state according to the acceleration speed. When the multirotor UAV is in the upcast state, the processing unit calculates one or more tilt angles of at least one shaft of the multirotor UAV according to the acceleration speed and the angular speed and executes an open feedback scheme according to the at least one tilt angle, to cause the multirotor UAV hover stably. In some embodiments, the processing unit compares each tilt angle with a corresponding angle limitation. When all tilt angles are not greater than the respective angle limitations, the processing unit outputs the driving signals by a negative feedback scheme. When any tilt angle is greater than the corresponding angle limitation, the processing unit outputs the driving signals by an open feedback scheme. After the open feedback scheme achieves a predetermined condition, the processing unit is switched to the negative feedback scheme to output the driving signals.

Based on the above, the hover-control method for multirotor UAV upcast at any angle to take off, the computer program product using the same, and the multirotor UAV using the same according to any of the forgoing embodiments apply dual-feedback schemes to correct the tilt angle of the multirotor UAV, such that the tilt angle can be corrected without increasing the hardware costs of the multirotor UAV, and the multirotor UAV is capable of hovering in the air in response to any upcasting angle without extra cost.

BRIEF DESCRIPTION OF THE DRAWINGS

The disclosure will become more fully understood from the detailed description given herein accompanying by the following figures, which are illustration only, and thus not limitative of the disclosure, wherein.

DETAILED DESCRIPTION

Figure 1:
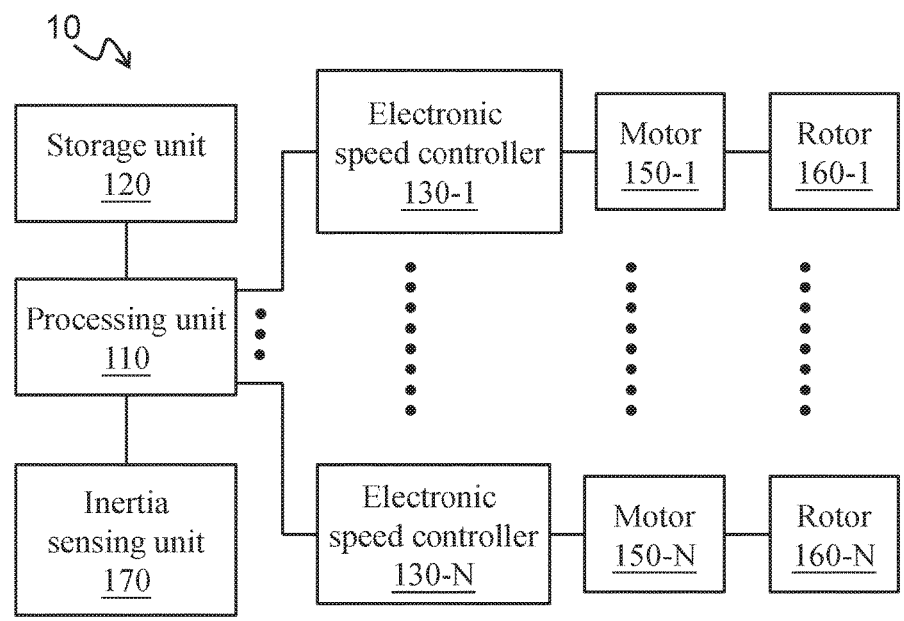
FIG. 1 illustrates a schematic block diagram of a multirotor unmanned aerial vehicle (UAV) upcast at any angle to take off according to an exemplary embodiment of the instant disclosure.
Figure 2:
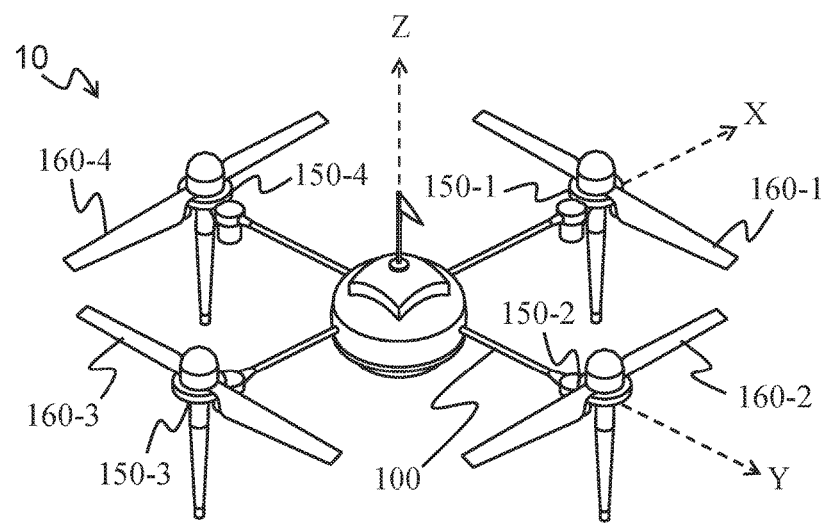
FIG. 2 illustrates a perspective view of a multirotor UAV upcast at any angle to take off according to an exemplary embodiment of the instant disclosure.
Figure 3:
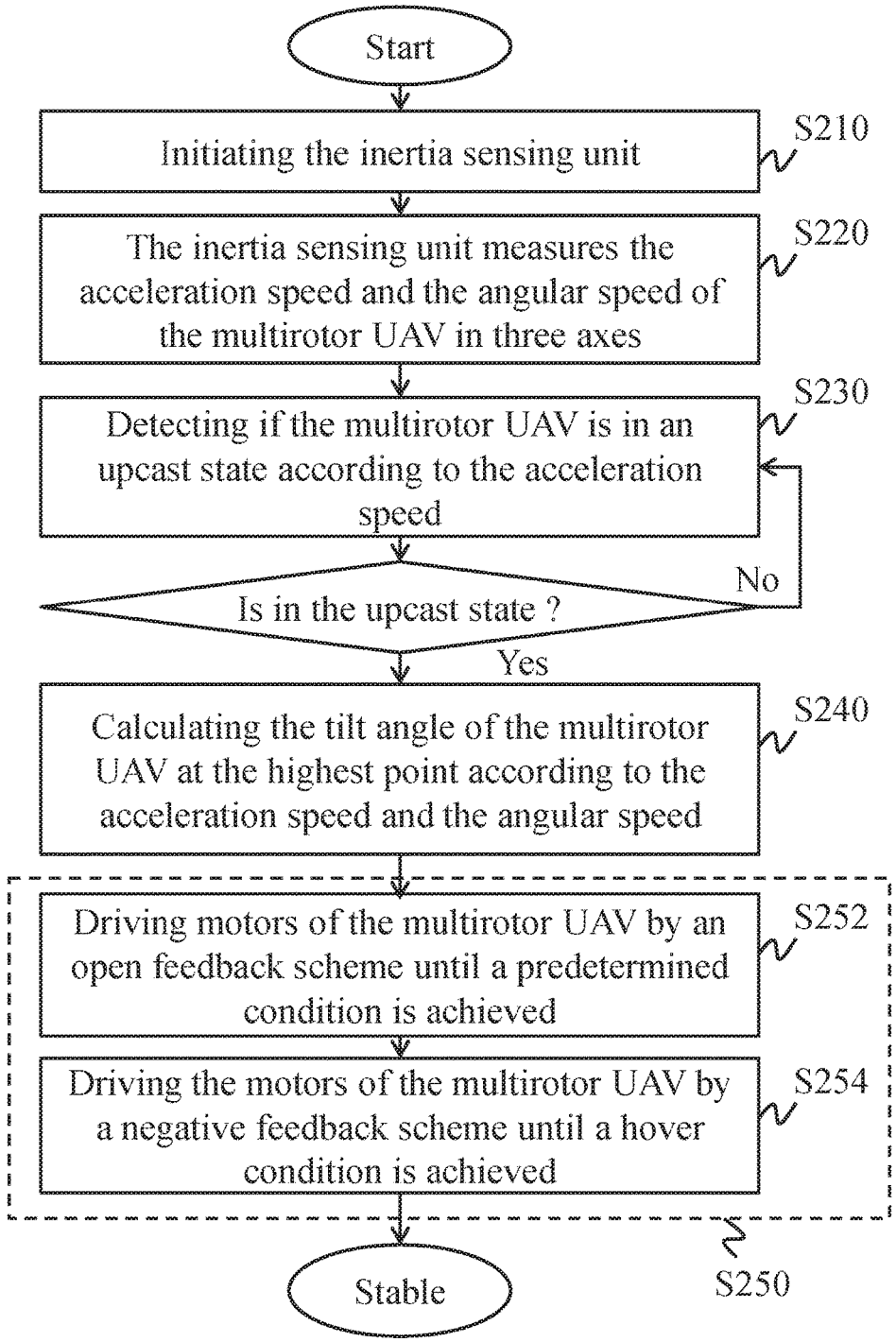
FIG. 3 illustrates a flowchart of a hover-control method for multirotor UAV upcast at any angle to take off according to an exemplary embodiment of the instant disclosure.

FIG. 1 illustrates a schematic block diagram of a multirotor unmanned aerial vehicle (UAV) upcast at any angle to take off according to an exemplary embodiment of the instant disclosure. FIG. 2 illustrates a perspective view of a multirotor UAV upcast at any angle to take off according to an exemplary embodiment of the instant disclosure. FIG. 3 illustrates a flowchart of a hover-control method for multirotor UAV upcast at any angle to take off according to an exemplary embodiment of the instant disclosure.

Please refer to FIGS. 1 and 2. The multirotor UAV 10 comprises a processing unit 110, a storage unit 120, a plurality of electronic speed controllers (ESC) 130-1~130-N, a plurality of motors 150-1~150-N, a plurality of rotors 160-1~160-N, and an inertia sensing unit 170. The processing unit 110 is coupled to the storage unit 120, the electronic speed controllers 130-1~130-N, and the inertia sensing unit 170. The electronic speed controllers 130-1~130-N are respectively coupled to the motors 150-1~150-N. The motors 150-1~150-N are respectively shaft-connected to the rotors 160-1~160-N, wherein N is a positive integer greater than 1. In this embodiment, the processing unit 110, the storage unit 120, the electronic speed controllers 130-1~130-N, the motors 150-1~150-N, the rotors 160-1~160-N, and the inertia sensing unit 170 are assembled on a frame 100 of the multirotor UAV 10.

In this embodiment, the electronic speed controllers 130-1~130-N receives a plurality of driving signals from the processing unit 110 respectively, and each of the electronic speed controllers 130-1~130-N drives the corresponding motor 150-1~150-N according the corresponding driving signal, so that each of the motors 150-1~150-N rotates the corresponding rotor 160-1~160-N to generate an upward driving force. The inertia sensing unit 170 measures an acceleration speed and an angular speed of the multirotor UAV 10. The processing unit 110 controls a flying state of the multirotor UAV 10 by adjusting the driving signals.

In some embodiments, as shown in FIG. 3, when the multirotor UAV 10 is actuated (for example, booting or resetting), the multirotor UAV 10 is placed on the ground or on a platform to execute an initialization procedure. In the initialization procedure, the inertia sensing unit 170 is initialized (step S210). After the initialization procedure, the initialization data of the inertia sensing unit 170 is sent to the processing unit 110 and the processing unit 110 starts to continuously measure the acceleration speed and the angular speed of the multirotor UAV 10 in three axes, e.g., the X axis, the Y axis, and the Z axis of the Cartesian coordinate (step S220). The processing unit 110 calculates an initial state of the multirotor UAV 10 (the state when the multirotor UAV 10 is not upcast, for example, the initial state may be the acceleration speeds or angles of the multirotor UAV 10 in the three axes), and the initial state is stored in the storage unit 120.

And then, the processing unit 110 detects if the multirotor UAV 10 is in the upcast state or not according to the acceleration speed (step S230). In some embodiments, at the moment the multirotor UAV 10 being upcast to the air, the inertia sensing unit 170 measures a negative acceleration speed. Therefore, at the first time the processing unit 110 receives a negative speed measured by the inertia sensing unit 170, the processing unit 110 determines the multirotor UAV 10 is in the upcast state.

When the multirotor UAV 10 is not in the upcast state, the processing unit 110 keeps the measurement of the acceleration speed and the angular speed of the multirotor UAV 10.

For example, when the multirotor UAV 10 is in a stationary state (for example, when the multirotor UAV 10 is placed on the ground or on a platform), the acceleration speed in X axis is 0 m/s$^2$, the acceleration speed in Y axis is 0 m/s$^2$, and the acceleration speed in Z axis is about 9.8 m/s$^2$. When the multirotor UAV 10 is to be upcast, the acceleration speeds in X axis and Y axis are continuously changed, while the acceleration speed in Z axis is still about 9.8 m/s$^2$ ($\pm$2 m/s$^2$).

When the multirotor UAV 10 is in the upcast state, the processing unit 110 calculates a tilt angle of the multirotor UAV 10 at the highest position according to the acceleration speed and the angular speed of the multirotor UAV 10 (step S240). In some embodiments, when the multirotor UAV 10 is in the upcast state, the processing unit 110 determines if the multirotor UAV 10 is at the highest position (that is, if the acceleration speed of the multirotor UAV 10 is zero) according to the acceleration speed of the multirotor UAV 10. When the multirotor UAV 10 is at the highest position (that is, when the acceleration speed of the multirotor UAV 10 is zero), the processing unit 110 calculates a tilt angle of at least one shaft of the multirotor UAV 10 according to the acceleration speed and the angular speed of the multirotor UAV 10. The tilt angle of the shaft may be, but not limited to, a roll angle, a pitch angle, a yaw angle, or the combination thereof. The roll angle is changed when the multirotor UAV 10 is rotated clockwise or counterclockwise about the longitudinal axis (i.e., X axis). The pitch angle is changed when the multirotor UAV 10 is rotated clockwise or counterclockwise about the lateral axis (i.e., Y axis). The yaw angle is changed when the multirotor UAV 10 is rotated clockwise or counterclockwise about the vertical axis (i.e., Z axis).

For example, when the acceleration speed in Z axis is 0 m/s², meaning that the multirotor UAV 10 is at the highest position, and the multirotor UAV 10 is going to perform a freefall. And then, the acceleration speed in Z axis gradually reduces. The processing unit 110 can calculate the tilt angle via the Formula I provided below.

$$\begin{bmatrix} a_x \\ a_y \\ a_z \end{bmatrix} = \begin{bmatrix} -g\sin(\text{Pitch}) \\ g\cos(\text{Pitch})\sin(\text{Roll}) \\ g\cos(\text{Roll})\cos(\text{Pitch}) \end{bmatrix} \quad \text{Formula I}$$

Wherein, Roll represents the value of the roll angle, and Pitch represents the value of the pitch angle.

The processing unit 110 executes an open feedback scheme according to the at least one tilt angle to allow the multirotor UAV 10 hovering in the air, i.e., to allow the multirotor UAV 10 flying stably (step S250).

In some embodiments, when any of the at least one tilt angle is greater than a corresponding angle limitation, the processing unit 110 drives the motors 150-1~150-N of the multirotor UAV 10 by the open feedback scheme until a predetermined condition is achieved (step S252). When all of the at least one tilt angle are not greater than the respective angle limitations, the processing unit 110 drives the motors 150-1~150-N of the multirotor UAV 10 by a negative feedback scheme until a hover condition is achieved (step S254). In one embodiment, if the multirotor UAV 10 may be designed to use one tilt angle to detect the flying state of the multirotor UAV 10, the processing unit 110 drives the motors 150-1~150-N of the multirotor UAV 10 by the open feedback scheme when any of the at least one tilt angle (i.e., the tilt angle) is greater than a corresponding angle limitation; while the processing unit 110 drives the motors 150-1~150-N of the multirotor UAV 10 by the negative feedback scheme when all of the at least one tilt angle (i.e., the tilt angle) is not greater than the angle limitation. In another embodiment, if the multirotor UAV 10 may be designed to use three tilt angles to detect the flying state of the multirotor UAV 10, the processing unit 110 drives the motors 150-1~150-N of the multirotor UAV 10 by the open feedback scheme when any of the at least one tilt angle (i.e., any of the three tilt angles) is greater than a corresponding angle limitation; while the processing unit 110 drives the motors 150-1~150-N of the multirotor UAV 10 by the negative feedback scheme when all of the at least one tilt angle (i.e., all of the three tilt angles) are not greater than the respective angle limitations.

Figure 4:
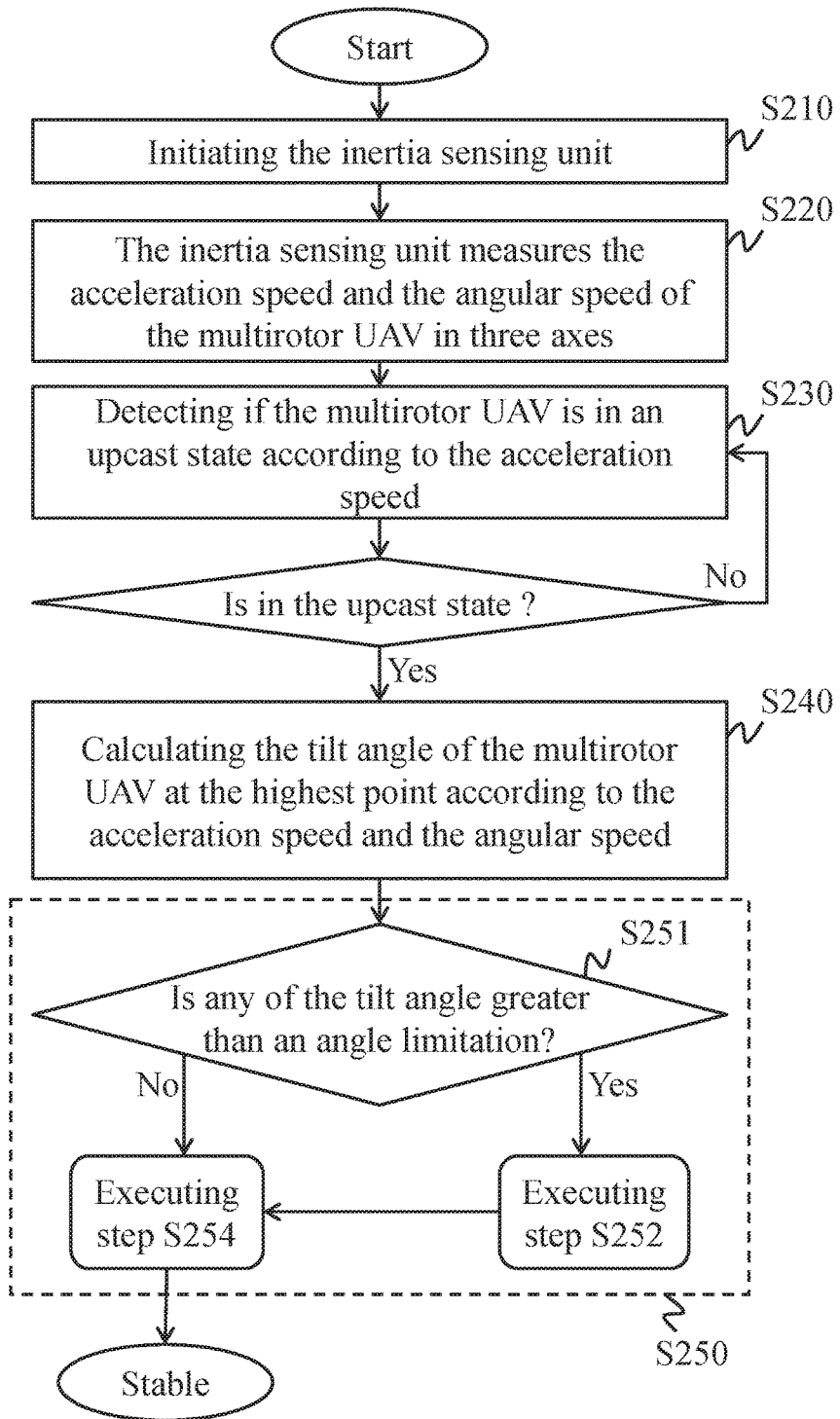
FIG. 4 illustrates a detailed flowchart of one embodiment of the step S250.

In some embodiments, the angle limitation may be a threshold angle. As referring to FIG. 4, the processing unit 110 compares the at least one tilt angle with the threshold angle to ensure if any of the at least one tilt angle is greater than the corresponding threshold angle (step S250). In some embodiments, the threshold angle may be 45 degrees.

When all of the at least one tilt angle are not greater than the respective threshold angles, the processing unit 110 executes the negative feedback scheme (i.e., the step S254) to converge the at least one tilt angle of the multirotor UAV 10.

When any of the at least one tilt angle is greater than the corresponding threshold angle, the processing unit 110 executes the open feedback scheme (i.e., step S252) to decrease the at least one tile angle of the multirotor UAV 10.

When the open feedback scheme (i.e., step S252) achieves the predetermined condition, the processing unit 110 switches the open feedback scheme to the negative feedback scheme (i.e., step S254) to converge the at least one tilt angle of the multirotor UAV 10.

Figure 5:
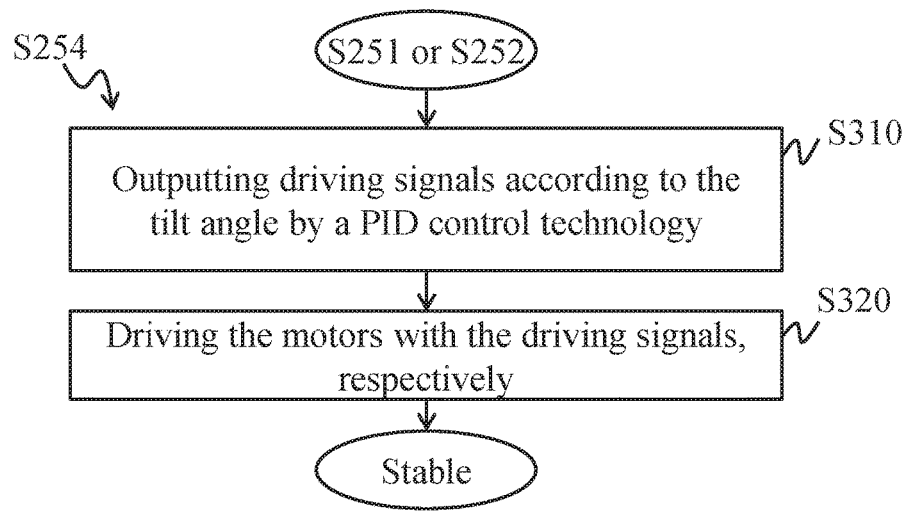
FIG. 5 illustrates a detailed flowchart of one embodiment of the step S254.

FIG. 5 illustrates a detailed flowchart of one embodiment of the step S254.

In some embodiments, as referring to FIG. 5, in the negative feedback scheme (step S254), the processing unit 110 outputs the driving signals to the electronic speed controllers 130-1~130-N according to the at least one tilt angle by using a proportional-integral-derivative (PID) control technology (step S310), and each of the electronic speed controllers 130-1~130-N respectively drives the motor 150-1~150-N coupled to the electronic speed controller 130-1~130-N by the corresponding driving signal (step S320). In addition, the processing unit 110 adjusts the driving signal (i.e., the rotation speeds of the motor 150-1~150-N) according to the change of the at least one tilt angle until the at least one tilt angle achieves a horizontal angle. In some embodiments, the horizontal angle is less than or equal to 1 degree. In one embodiment, the horizontal angle is about 0 degree.

Figure 6:
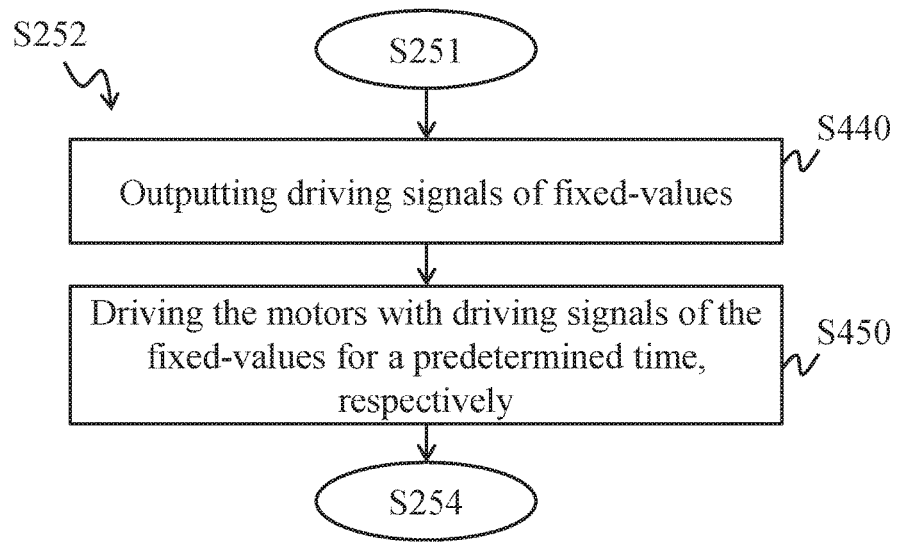
FIG. 6 illustrates a detailed flowchart of one embodiment of the step S252.

FIG. 6 illustrates a detailed flowchart of one embodiment of the step S252.

In some embodiments, as referring to FIG. 6, in the open feedback scheme (step S252), the processing unit 110 outputs a plurality of driving signals of respective fixed-values to the electronic speed controllers 130-1~130-N, respectively (step S440), and then each of the electronic speed controllers 130-1~130-N drives the motor 150-1~150-N coupled to the electronic speed controller 130-1~130-N to operate for a predetermined time according to the driving signal of the corresponding fixed-value (step S450). In other words, the processing unit 110 continuously outputs the driving signals of the respective fixed-values within the time duration of the predetermined time, so that each of the motors 150-1~150-N is rotated for the predetermined time by a predetermined rotation speed which corresponds to the driving signal of the corresponding fixed-value.

Figure 7:
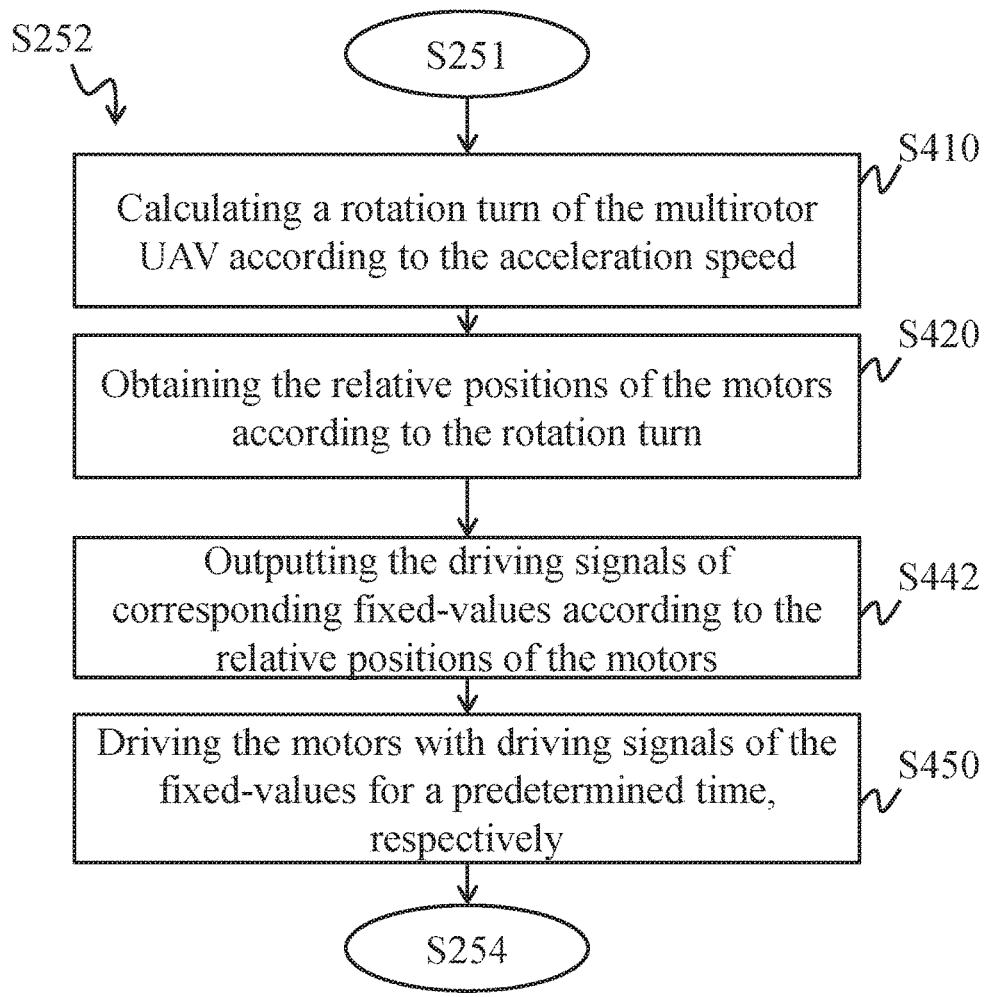
FIG. 7 illustrates a detailed flowchart of another embodiment of the step S252.

FIG. 7 illustrates a detailed flowchart of another embodiment of the step S252.

In some embodiments, as referring to FIG. 7, in the open feedback scheme (step S252), the processing unit 110 accumulates the rotation turn of the multirotor UAV 10 at the highest position according to the acceleration speed and the initial state (step S410) and obtains the relative positions of the motors 150-1~150-N at the highest position according to the rotation turn of the multirotor UAV 10 (step S420). For example, when the roll angle is greater or equal to 360 degrees, the processing unit 110 determines the multirotor UAV 10 rolls for a full circle. When the pitch angle is greater or equal to 360 degrees, the processing unit 110 determines the multirotor UAV 10 pitches for a full circle.

And then, the processing unit 110 outputs the driving signals of the respective fixed-values to the electronic speed controllers 130-1~130-N, respectively, according to the relative positions of the motors 150-1~150-N(i.e., according to the position the motor 150-1~150-N is located relative to the positions the other motors 150-1~150-N are located) (step S442), so that each of the electronic speed controllers 130-1~130-N drives the motor 150-1~150-N coupled to the electronic speed controller 130-1~130-N to operate for a predetermined time according to the driving signal of the corresponding fixed-value (step S450). In other words, depending on the position the motor 150-1~150-N is located at, either the upper position, the middle position, or the lower position, the processing unit 110 provides the motor 150-1~150-N with driving signals of specific fixed-values corresponding to the respective positions, respectively. In some embodiments, the processing unit 110 may generate the driving signals of the specific fixed-values corresponding to the motors 150-1~150-N by formula conversion means or lookup tables. In some embodiments, the predetermined time may be 1 to 2 seconds.

For example, supposed that the multirotor UAV 10 is a four-rotor UAV which has four motors 150-1, 150-2, 150-3, and 150-4, and the specification of each of the motors 150-1, 150-2, 150-3, and 150-4 is 1000 KV (rpm per volt). In a stable hovering state, the driving voltage is 11 V. Therefore, the rotation speed of each of the motors 150-1, 150-2, 150-3, and 150-4 is about 11000 rpm (revolution(s) per minute). For the sake of clarity, in the following embodiments, the motors 150-1, 150-2, 150-3, and 150-4 are respectively called a first motor 150-1, a second motor 150-2, a third motor 150-3, a the fourth motor 150-4.

Figure 9A:
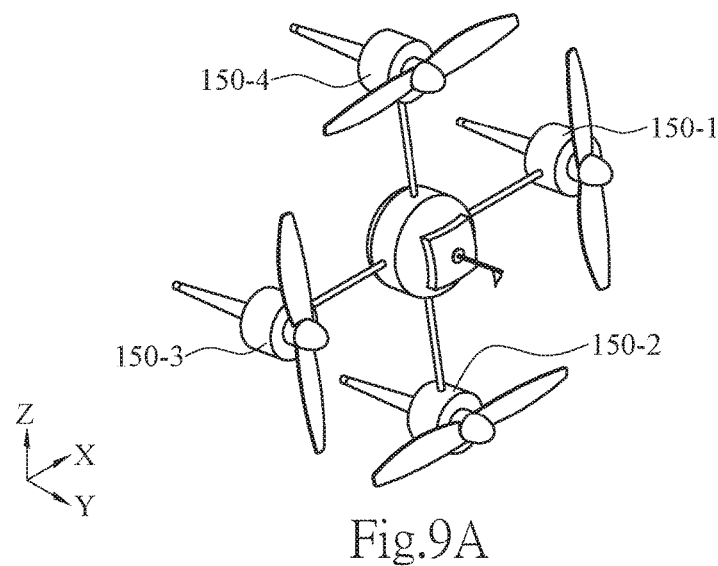
FIG. 9A illustrates a perspective view of first state of a multirotor UAV upcast at any angle to take off according to the exemplary embodiment of the instant disclosure.

In one case that the tilt angle is about 80 to 90 degrees (refer to FIG. 9A), if the second motor 150-2 is obviously at the lowermost position among the positions of the motors (i.e., the second motor 150-2 is at the lowest position among the positions of the motors), the fourth motor 150-4 is obviously at the uppermost position among the positions of the motors (i.e., the fourth motor 150-4 is at the highest position among the positions of the motors), and the first motor 150-1 and the third motor 150-3 are between the second motor 150-2 and the fourth motor 150-4 (i.e., the first motor 150-1 and the third motor 150-3 are at the middle positions among the positions of the motors), the processing unit 110 would decrease the rotation speed of the fourth motor 150-4 by 500 rpm (i.e., the rotation speed of the fourth motor 150-4 corresponds to a driving signal which is about 10.5 V), and increase the rotation speed of the second motor 150-2 by 500 rpm (i.e., the rotation speed of the second motor 150-2 corresponds to a driving signal which is about 11.5 V). While the rotation speed of the first motor 150-1 and the rotation speed of the third motor 150-3 would be retained (i.e., the rotation speeds of the first motor 150-1 and the third motor 150-3 correspond to a driving signal which is about 11 V).

Figure 9B:
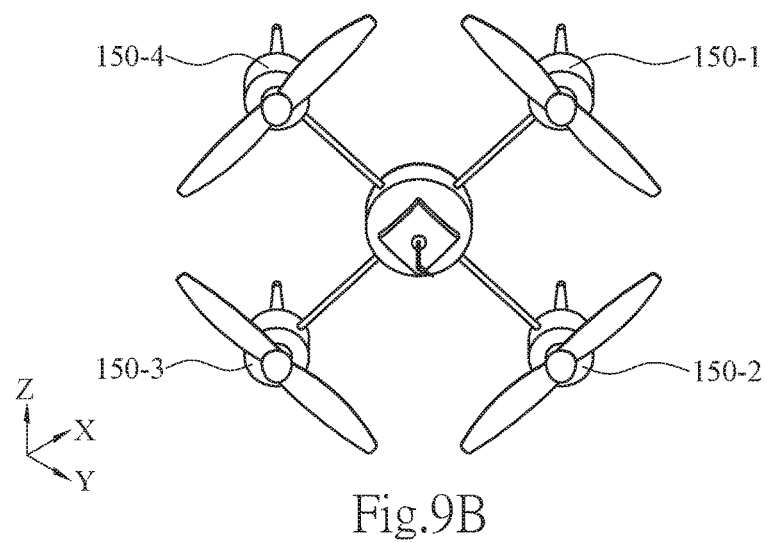
FIG. 9B illustrates a perspective view of second state of the multirotor UAV upcast at any angle to take off according to the exemplary embodiment of the instant disclosure.

In another case that the tilt angle is about 80 to 90 degrees (refer to FIG. 9B), if the second motor 150-2 and the third motor 150-3 are at two lowermost positions among the positions of the motors, and the first motor 150-1 and the fourth motor 150-4 are at two uppermost positions among the positions of the motors, the processing unit 110 would respectively decrease the rotation speed of the first motor 150-1 and the rotation speed of the fourth motor 150-4 by 250 rpm (i.e., the rotation speeds of the first motor 150-1 and the fourth motor 150-4 correspond to a driving signal which is about 10.75 V), and would respectively increase the rotation speed of the second motor 150-2 and the rotation speed of the third motor 150-3 by 250 rpm (i.e., the rotation speeds of the second motor 150-2 and the third motor 150-3 correspond to a driving signal which is about 11.25 V).

Figure 9C:
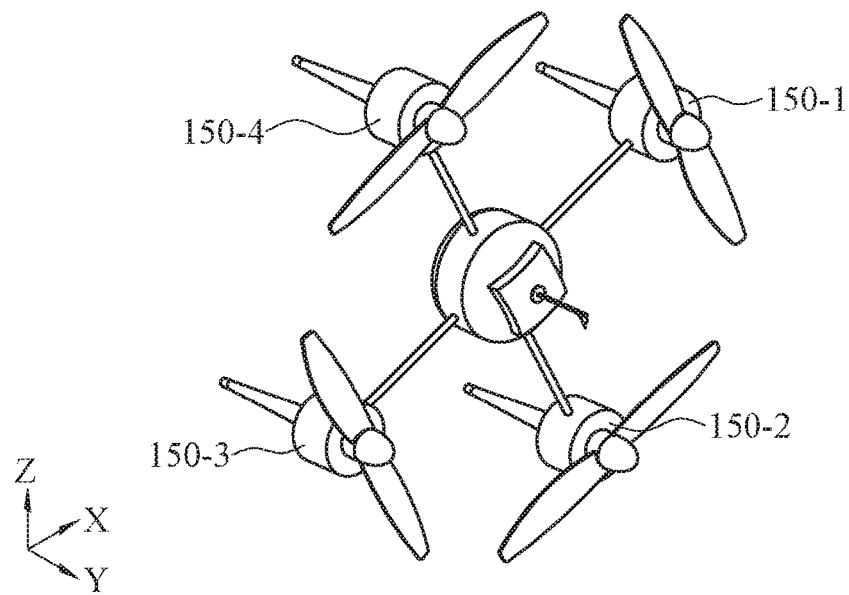
FIG. 9C illustrates a perspective view of third state of the multirotor UAV upcast at any angle to take off according to the exemplary embodiment of the instant disclosure.

In yet another cast that the tilt angle is about 80 to 90 degrees (refer to FIG. 9C), if the second motor 150-2 and the third motor 150-3 are at two lowermost positions among the positions of the motors while the third motor 150-3 is slightly higher than the second motor 150-2, and the first motor 150-1 and the fourth motor 150-4 are at two uppermost positions among the positions of the motors while the fourth motor 150-4 is slightly higher than the first motor 150-1, the processing unit 110 would decrease the rotation speed of the first motor 150-1 by 220 rpm (i.e., the rotation speed of the first motor 150-1 corresponds to a driving signal which is about 10.78 V), decrease the rotation speed of the fourth motor 150-4 by 280 rpm (i.e., the rotation speed of the fourth motor 150-4 corresponds to a driving signal which is about 10.72 V), increase the rotation speed of the third motor 150-3 by 220 rpm (i.e., the rotation speed of the third motor 150-3 corresponds to a driving signal which is about 11.22 V), and increase the rotation speed of the second motor 150-2 by 280 rpm (i.e., the rotation speed of the second motor 150-2 corresponds to a driving signal which is about 11.28 V).

Figure 9D:
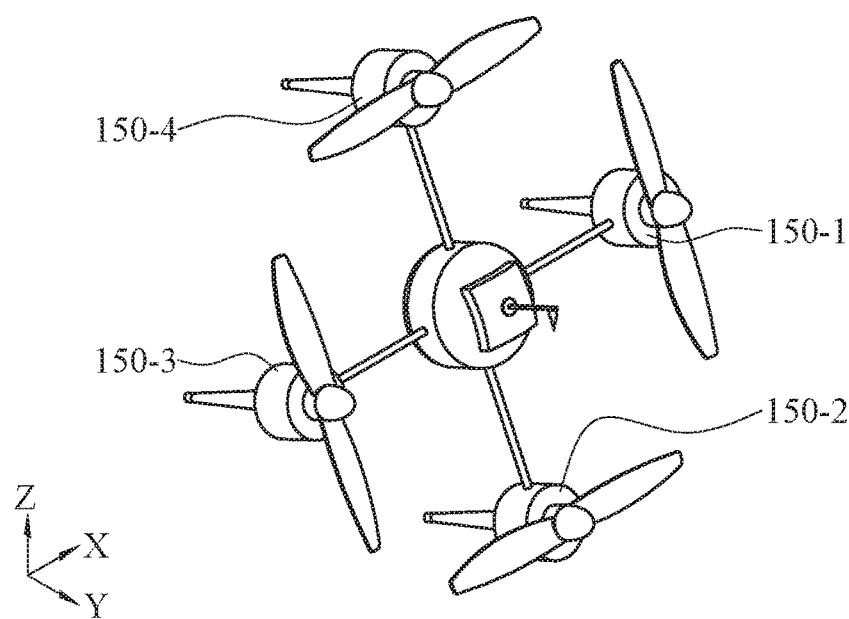
FIG. 9D illustrates a perspective view of fourth state of the multirotor UAV upcast at any angle to take off according to the exemplary embodiment of the instant disclosure.

In one case that the tilt angle is about 65 to 80 degrees (refer to FIG. 9D), if the second motor 150-2 is obviously at the lowermost position among the positions of the motors (i.e., the second motor 150-2 is at the lowest position among the positions of the motors), the fourth motor 150-4 is obviously at the uppermost position among the positions of the motors (i.e., the fourth motor 150-4 is at the highest position among the positions of the motors), and the first motor 150-1 and the third motor 150-3 are between the second motor 150-2 and the fourth motor 150-4 (i.e., the first motor 150-1 and the third motor 150-3 are at the middle positions among the positions of the motors), the processing unit 110 would decrease the rotation speed of the fourth motor 150-4 by 300 rpm (i.e., the rotation speed of the fourth motor 150-4 corresponds to a driving signal which is about 10.7 V), and increase the rotation speed of the second motor 150-2 by 300 rpm (i.e., the rotation speed of the second motor 150-2 corresponds to a driving signal which is about 11.3 V). While the rotation speed of the first motor 150-1 and the rotation speed of the third motor 150-3 would be retained (i.e., the rotation speeds of the first motor 150-1 and the third motor 150-3 correspond to a driving signal which is about 11 V).

Figure 9E:
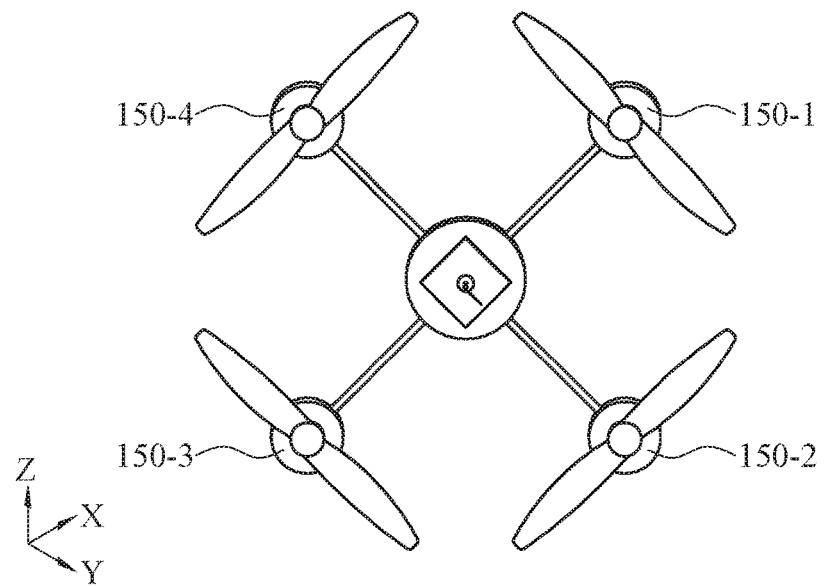
FIG. 9E illustrates a perspective view of fifth state of the multirotor UAV upcast at any angle to take off according to the exemplary embodiment of the instant disclosure.

In another case that the tilt angle is about 65 to 80 degrees (refer to FIG. 9E), if the second motor 150-2 and the third motor 150-3 are at two lowermost positions among the positions of the motors, and the first motor 150-1 and the fourth motor 150-4 are at two uppermost positions among the positions of the motors, the processing unit 110 would respectively decrease the rotation speed of the first motor 150-1 and the rotation speed of the fourth motor by 150 rpm (i.e., the rotation speeds of the first motor 150-1 and the fourth motor 150-4 correspond to a driving signal which is about 10.85 V), and would respectively increase the rotation speed of the second motor 150-2 and the rotation speed of the third motor 150-3 by 150 rpm (i.e., the rotation speeds of the second motor 150-2 and the third motor 150-3 correspond to a driving signal which is about 11.15 V).

Figure 9F:
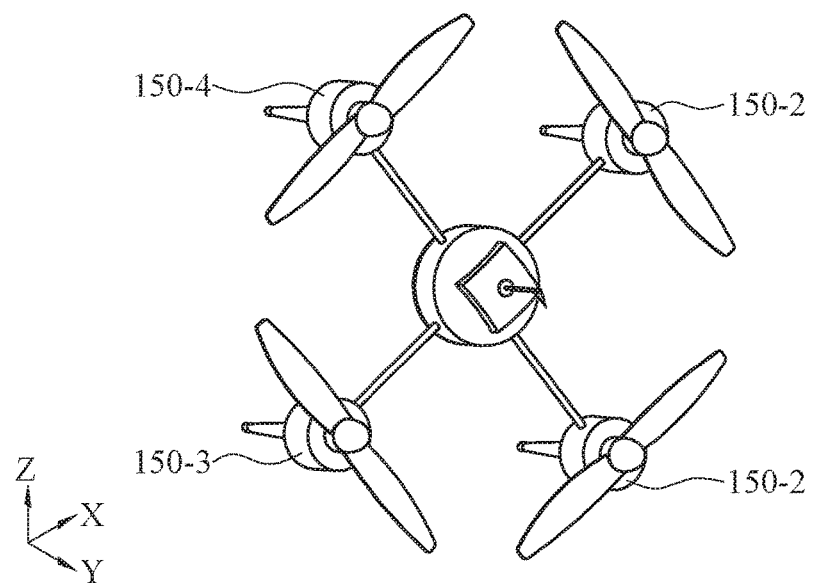
FIG. 9F illustrates a perspective view of sixth state of the multirotor UAV upcast at any angle to take off according to the exemplary embodiment of the instant disclosure.

In yet another cast that the tilt angle is about 65 to 80 degrees (refer to FIG. 9F), if the second motor 150-2 and the third motor 150-3 are at two lowermost positions among the positions of the motors while the third motor 150-3 is slightly higher than the second motor 150-2, and the first motor 150-1 and the fourth motor 150-4 are at two uppermost positions among the positions of the motors while the fourth motor 150-4 is slightly higher than the first motor 150-1, the processing unit 110 would decrease the rotation speed of the first motor 150-1 by 120 rpm (i.e., the rotation speed of the first motor 150-1 corresponds to a driving signal which is about 10.88 V), decrease the rotation speed of the fourth motor 150-4 by 180 rpm (i.e., the rotation speed of the fourth motor 150-4 corresponds to a driving signal which is about 10.82 V), increase the rotation speed of the third motor 150-3 by 120 rpm (i.e., the rotation speed of the third motor 150-3 corresponds to a driving signal which is about 11.12 V), and increase the rotation speed of the second motor 150-2 by 180 rpm (i.e., the rotation speed of the second motor 150-2 corresponds to a driving signal which is about 11.18 V).

Figure 9G:
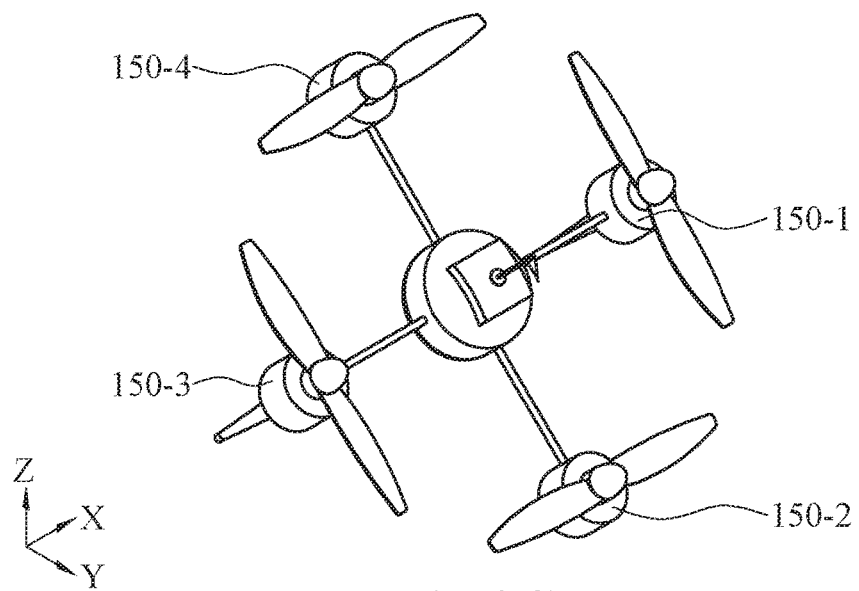
FIG. 9G illustrates a perspective view of seventh state of the multirotor UAV upcast at any angle to take off according to the exemplary embodiment of the instant disclosure.

In one case that the tilt angle is about 45 to 65 degrees (refer to FIG. 9G), if the second motor 150-2 is obviously at the lowermost position among the positions of the motors (i.e., the second motor 150-2 is at the lowest position among the positions of the motors), the fourth motor 150-4 is obviously at the uppermost position among the positions of the motors (i.e., the fourth motor 150-4 is at the highest position among the positions of the motors), and the first motor 150-1 and the third motor 150-3 are between the second motor 150-2 and the fourth motor 150-4 (i.e., the first motor 150-1 and the third motor 150-3 are at the middle positions among the positions of the motors), the processing unit 110 would decrease the rotation speed of the fourth motor 150-4 by 200 rpm (i.e., the rotation speed of the fourth motor 150-4 corresponds to a driving signal which is about 10.8 V), and increase the rotation speed of the second motor 150-2 by 200 rpm (i.e., the rotation speed of the second motor 150-2 corresponds to a driving signal which is about 11.2 V). While the rotation speed of the first motor 150-1 and the rotation speed of the third motor 150-3 would be retained (i.e., the rotation speeds of the first motor 150-1 and the third motor 150-3 correspond to a driving signal which is about 11 V).

Figure 9H:
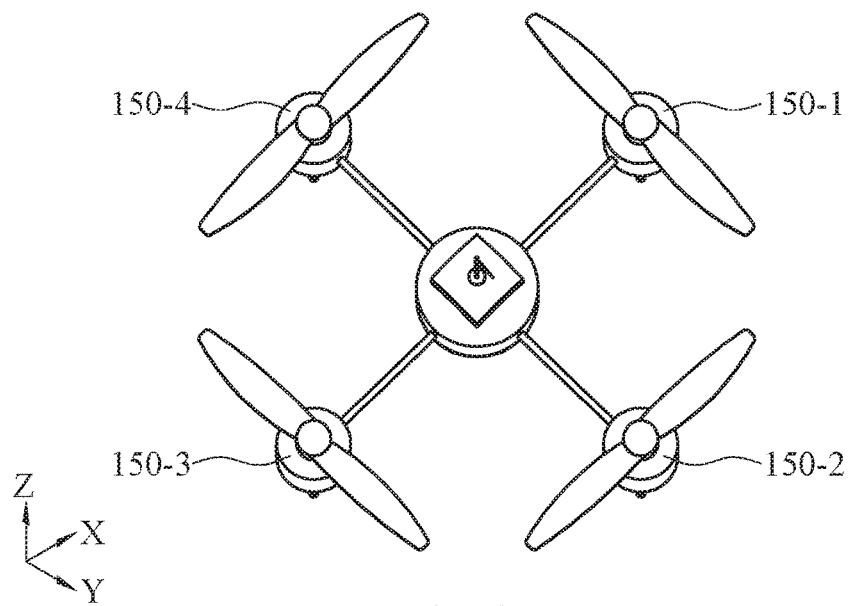
FIG. 9H illustrates a perspective view of eighth state of the multirotor UAV upcast at any angle to take off according to the exemplary embodiment of the instant disclosure.

In another case that the tilt angle is about 45 to 65 degrees (refer to FIG. 9H), if the second motor 150-2 and the third motor 150-3 are at two lowermost positions among the positions of the motors, and the first motor 150-1 and the fourth motor 150-4 are at two uppermost positions among the positions of the motors, the processing unit 110 would respectively decrease the rotation speed of the first motor 150-1 and the rotation speed of the fourth motor 150-4 by 100 rpm (i.e., the rotation speeds of the first motor 150-1 and the fourth motor 150-4 correspond to a driving signal which is about 10.9 V), and would respectively increase the rotation speed of the second motor 150-2 and the rotation speed of the third motor 150-3 by 100 rpm (i.e., the rotation speeds of the second motor 150-2 and the third motor 150-3 correspond to a driving signal which is about 11.1 V).

Figure 9I:
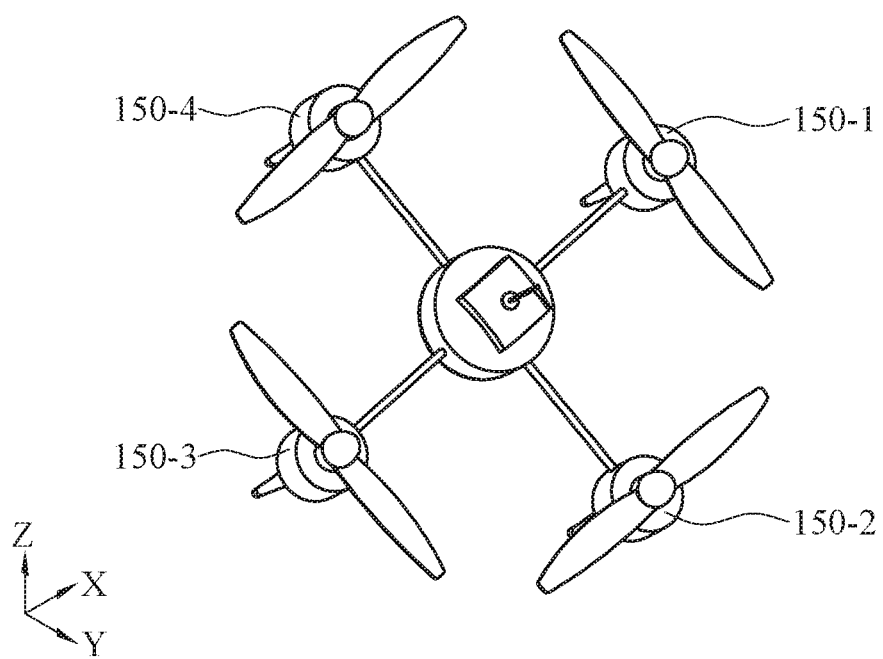
FIG. 9I illustrates a perspective view of ninth state of the multirotor UAV upcast at any angle to take off according to the exemplary embodiment of the instant disclosure.

In yet another cast that the tilt angle is about 45 to 65 degrees (refer to FIG. 9I), if the second motor 150-2 and the third motor 150-3 are at two lowermost positions among the positions of the motors while the third motor 150-3 is slightly higher than the second motor 150-2, and the first motor 150-1 and the fourth motor 150-4 are at two uppermost positions among the positions of the motors while the fourth motor 150-4 is slightly higher than the first motor 150-1, the processing unit 110 would decrease the rotation speed of the first motor 150-1 by 20 rpm (i.e., the rotation speed of the first motor 150-1 corresponds to a driving signal which is about 10.98 V), decrease the rotation speed of the fourth motor 150-4 by 80 rpm (i.e., the rotation speed of the fourth motor 150-4 corresponds to a driving signal which is about 10.92 V), increase the rotation speed of the third motor 150-3 by 20 rpm (i.e., the rotation speed of the third motor 150-3 corresponds to a driving signal which is about 11.02 V), and increase the rotation speed of the second motor 150-2 by 80 rpm (i.e., the rotation speed of the second motor 150-2 corresponds to a driving signal which is about 11.08 V).

In the aforementioned cases, after the rotation speeds of the motors 150-1, 150-2, 150-3, and 150-4 are adjusted, each of the motors 150-1, 150-2, 150-3, and 150-4 rotates by the adjusted rotation speed for about 2 seconds, and then the rotation speed of each of the motors 150-1, 150-2, 150-3, and 150-4 is recovered back to the normal rotation speed (e.g., the aforementioned 11000 rpm). In other words, the processing unit 110 is switched to output normal driving signals (e.g., the aforementioned 11 V).

It is understood that, the rotation speed of the motor might be set differently according to the specification of the motor and the adjusted value also might be set differently according to the specification of the motor.

Figure 8:
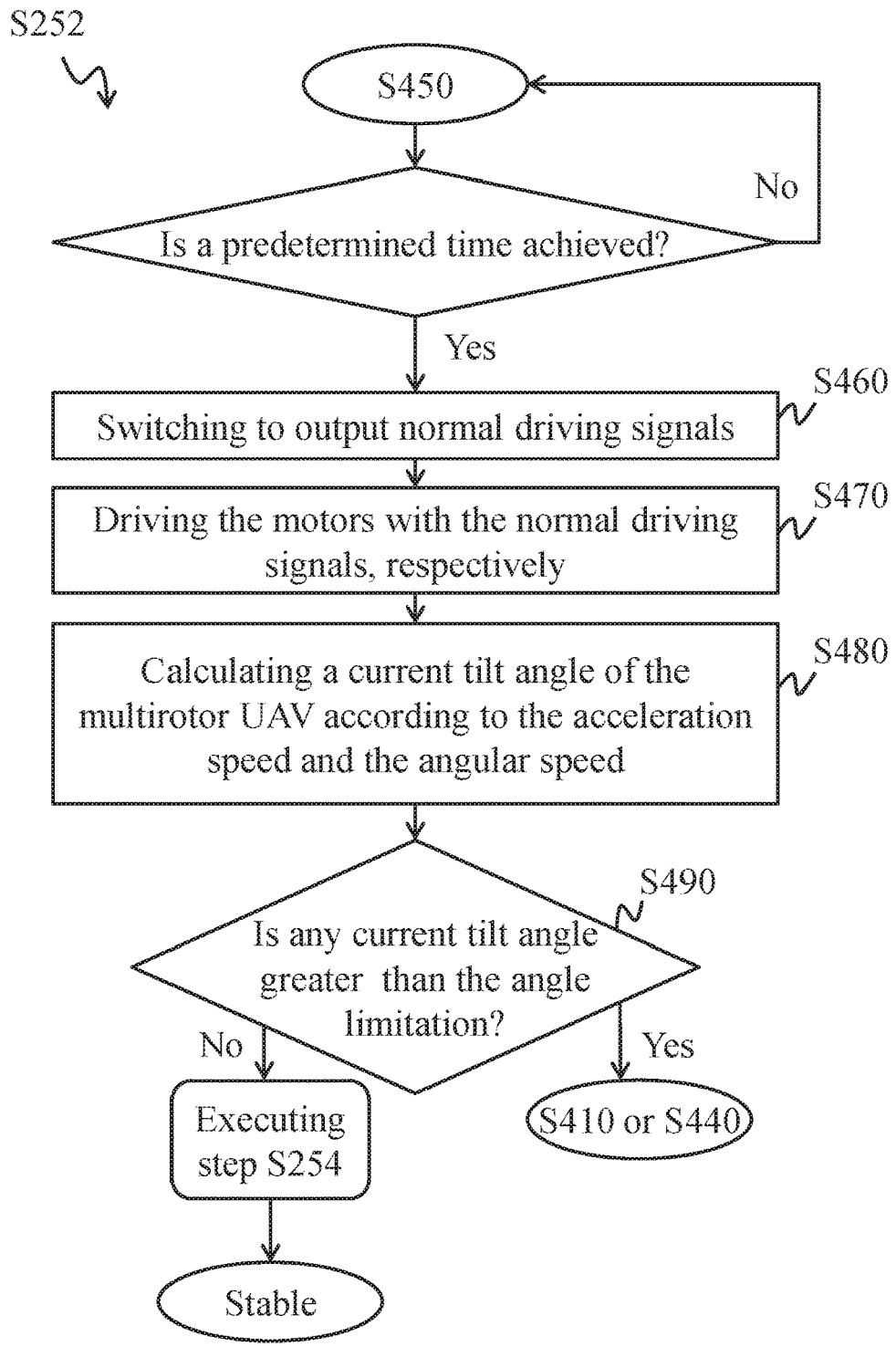
FIG. 8 illustrates a detailed flowchart of yet another embodiment of the step S252.

FIG. 8 illustrates a detailed flowchart of yet another embodiment of the step S252.

In some embodiments, as referring to FIG. 8, when the predetermined time is achieved, the rotation speed of each of the motors 150-1, 150-2, 150-3, and 150-4 would be switched back to the normal rotation speed, i.e., the processing unit 110 respectively outputs normal driving signals to the electronic speed controllers 130-1~130-N (step S460), so that each of the electronic speed controllers 130-1~130-N drives the motor 150-1~150-N coupled to the electronic speed controller 130-1~130-N according to the received normal driving signal (step S470).

In addition, the processing unit 110 would determine the tilt angle again. In other words, the processing unit 110 calculates a current tilt angle of at least one shaft of the multirotor UAV 10 according to the acceleration speed and the angular speed measured by the inertia sensing unit 170 (step S480). And, the processing unit 110 compares the at least one current tilt angle with the threshold angle to ensure if any of the at least one tilt angle is greater than the corresponding threshold angle (step S490).

When all of the at least one current tilt angle are not greater than the respective threshold angles, the processing unit 110 completes the open feedback scheme (step S252) and continues to execute the negative feedback scheme (step S254) to converge the at least one tilt angle of the multirotor UAV 10.

Conversely, when any of the at least one current tilt angle is greater than the corresponding threshold angle, the processing unit 110 readjusts the rotation speed of the motor 150-1~150-N for a predetermined time (i.e., the processing unit 110 returns to execute the step S410 or the step S440). The processing unit 110 repeatedly adjusts and determines the at least one current tilt angle until all of the at least one current tilt angle are not greater than the respective threshold angles.

In some embodiments, when the tilt angle achieves the horizontal angle, the processing unit 110 executes a monitoring procedure to continuously monitor the change of the at least one tilt angle. In addition, when the tilt angle is greater than the horizontal angle, the processing unit 110 re-executes the feedback schemes.

In this embodiment, the storage unit 120 is for storing related software or firmware programs, data required by the processing unit 110, data generated during the operation of the processing unit 110, etc. In some embodiments, the storage unit 120 may be implemented by one or more storage member. Specifically, the storing member may be, but not limited to, a memory or a register.

In addition, the hover-control method for multirotor UAV upcast at any angle to take off according to any of the forgoing embodiments can be implemented by a computer program product. The computer program product comprises at least one program instruction. Accordingly, when the multirotor UAV 10 loads and executes the program instruction, the hover-control method according to any of the forgoing embodiments can be applied to the multirotor UAV 10. In some embodiments, the computer program product is a computer readable medium, and the program instruction is stored in the computer readable medium for the multirotor UAV 10 to read and load. In some embodiments, the program instruction itself may be the computer program product, and the program command is transmitted to the mutlirotor UAV wirely or wirelessly.

Based on the above, the hover-control method for multirotor UAV upcast at any angle to take off, a computer program product using the same, and a multirotor UAV using the same according to any of the forgoing embodiments apply dual-feedback schemes to correct the tilt angle of the multirotor UAV, such that the tilt angle can be corrected without increasing the hardware costs of the multirotor UAV, and the multirotor UAV is capable of hovering in the air in response to any upcasting angle without extra cost.

While the disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A hover-control method for multirotor unmanned aerial vehicle (UAV) which has been projected upwardly by an external force in an upcast state, the hover-control method comprises:
   sensing the upcast state of the multirotor UAV by an inertia sensing unit;
   sensing a tilt angle of at least one shaft of the multirotor UAV at a highest position by the inertia sensing unit when the multirotor UAV is in the upcast state; and
   driving, by a processor, a plurality of motors of the multirotor UAV by a dual feedback scheme based on a determination of whether the tilt angle of the at least one shaft of the multirotor UAV at the highest position is greater than a corresponding angle limitation to make the UAV hover, wherein the dual feedback scheme includes an open feedback scheme and a negative feedback scheme.

2. The hover-control method according to claim 1, wherein the step of sensing the upcast state of the multirotor UAV comprises:
   measuring an acceleration speed by an acceleration meter of the inertia sensing unit; and
   determining the multirotor UAV is in the upcast state when the acceleration speed is negative.

3. The hover-control method according to claim 1, wherein driving the plurality of motors comprises:
   driving the plurality of motors of the multirotor UAV by the open feedback scheme until a predetermined condition is achieved when any of the at least one tilt angle is greater than the corresponding angle limitation; and
   driving the plurality of motors of the multirotor UAV by a negative feedback scheme until a hover condition is achieved when all of the at least one tilt angle are not greater than the corresponding angle limitations.

4. The hover-control method according to claim 3, wherein the predetermined condition is a predetermined time, and the step of driving the plurality of motors of the multirotor UAV by the open feedback scheme comprises:
   calculating a rotation turn of the multirotor UAV by an acceleration meter of the inertia sensing unit;
   obtaining a plurality of relative positions of the plurality of motors according to the rotation turn of the multirotor UAV; and
   driving each of the plurality of motors with a driving signal of a fixed-value corresponding to the relative position of the motor for the predetermined time.

5. The hover-control method according to claim 4, wherein the step of driving each of the plurality of motors with the driving signal of the fixed-value corresponding to the relative position of the motor for the predetermined time comprises:
   decreasing rotation speed of a motor at an uppermost position among the positions of the plurality of motors;
   increasing rotation speed of a motor at a lowermost position among the positions of the plurality of motors; and
   retaining rotation speeds of two motors at middle positions among the positions of the plurality of motors.

6. The hover-control method according to claim 4, wherein the step of driving each of the plurality of motors with the driving signal of the fixed-value corresponding to the relative position of the motor for the predetermined time comprises:
   decreasing rotation speeds of two motors at uppermost position among the positions of the plurality of motors by the same value; and
   increasing rotation speeds of two motors at lowermost position among the positions of the plurality of motors by the same value.

7. The hover-control method according to claim 4, wherein the step of driving each of the plurality of motors to operate for the predetermined time by the driving signal of the fixed-value corresponding to the relative position of the motor comprises:
   decreasing rotation speeds of a motor at uppermost position and a motor closed to the motor at the uppermost position among the positions of the plurality of motors by different values; and
   increasing rotation speeds of a motor at lowermost position and a motor closed to the motor at the lowermost position among the positions of the plurality of motors by different values.

8. The hover-control method according to claim 3, wherein the step of driving the plurality of motors of the multirotor UAV by the open feedback scheme comprises:
   calculating a rotation turn of the multirotor UAV by an acceleration meter of the inertia sensing unit;
   obtaining a plurality of relative positions of the plurality of motors according to the rotation turn of the multirotor UAV;
   driving each of the plurality of motors with a driving signal of a fixed-value corresponding to the relative position of the motor for a predetermined time;
   sensing at least one current tilt angle of the at least one shaft of the multirotor UAV by the inertia sensing unit and comparing each of the at least one current tilt angle with a angle limitation when the predetermined time is achieved;
   returning to execute the step of driving each of the plurality of motors with the driving signal of the fixed-value corresponding to the relative position of the motor predetermined when any of the at least one current tilt angle is greater than the corresponding angle limitation; and determining the open feedback scheme achieves the predetermined condition when all of the at least one current tilt angle are not greater than the respective angle limitations.

9. The hover-control method according to claim 8, wherein the step of driving each of the plurality of motors with the driving signal of the fixed-value corresponding to the relative position of the motor for the predetermined time comprises:
   decreasing rotation speed of a motor at an uppermost position among the positions of the plurality of motors;
   increasing rotation speed of a motor at a lowermost position among the positions of the plurality of motors; and
   retaining rotation speeds of two motors at middle positions among the positions of the plurality of motors.

10. The hover-control method according to claim 8, wherein the step of driving each of the plurality of motors with the driving signal of the fixed-value corresponding to the relative position of the motor for the predetermined time comprises:
    decreasing rotation speeds of two motors at uppermost position among the positions of the plurality of motors by the same value; and
    increasing rotation speeds of two motors at lowermost position among the positions of the plurality of motors by the same value.

11. The hover-control method according to claim 8, wherein the step of driving each of the plurality of motors to operate for the predetermined time by the driving signal of the fixed-value corresponding to the relative position of the motor comprises:
    decreasing rotation speeds of a motor at uppermost position and a motor closed to the motor at the uppermost position among the positions of the plurality of motors by different values; and
    increasing rotation speeds of a motor at lowermost position and a motor closed to the motor at the lowermost position among the positions of the plurality of motors by different values.

12. The hover-control method according to claim 3, wherein the predetermined condition is a predetermined time, and the step of driving the plurality of motors of the multirotor UAV by the open feedback scheme comprises:
    driving the plurality of motors with a plurality of driving signals of respective fixed values for the predetermined time.

13. The hover-control method according to claim 12, wherein each of the driving signals is approximately equal to 11V when the multirotor UAV is in a stable hovering state, and wherein the step of driving the plurality of motors with the plurality of driving signals of the respective fixed-values for the predetermined time comprises:
    driving a motor at an uppermost position among the positions of the plurality of motors with a driving signal less than 11V of the plurality of driving signals;
    driving a motor at a lowermost position among the positions of the plurality of motors with a driving signal greater than 11V of the plurality of driving signals; and
    driving two motors at middle positions among the positions of the plurality of motors with a driving signal approximately equaling to 11V of the plurality of driving signals.

14. The hover-control method according to claim 12, wherein each of the driving signals is approximately equal to 11V when the multirotor UAV is in a stable hovering state, and wherein the step of driving the plurality of motors with the plurality of driving signals of the respective fixed-values for the predetermined time comprises:
    driving two motors at an uppermost positions among the positions of the plurality of motors with two driving signals which are less than 11V and have the same value of the plurality of driving signals; and
    driving two motors at lowermost positions among the positions of the plurality of motors with two driving signals which are greater than 11V and have the same value of the plurality of driving signals.

15. The hover-control method according to claim 12, wherein each of the driving signals is approximately equal to 11V when the multirotor UAV is in a stable hovering state, and wherein the step of driving the plurality of motors to operate for the predetermined time by the plurality of driving signals of the respective fixed-values comprises:
    driving a motor at an uppermost position among the positions and a motor closed to the motor at the uppermost position among the positions of the plurality of motors with two driving signals which are less than 11V and have different values of the plurality of driving signals; and
    driving a motor at a lowermost position among the positions and a motor closed to the motor at the lowermost position among the positions of the plurality of motors with two driving signals which are greater than 11V and have different values of the plurality of driving signals.

16. The hover-control method according to claim 3, wherein the step of driving the plurality of motors of the multirotor UAV by the open feedback scheme comprises:
    driving the plurality of motors with a plurality of driving signals of respective fixed-values for the predetermined time;
    sensing at least one current tilt angle of the at least one shaft of the multirotor UAV by the inertia sensing unit and comparing each of the at least one current tilt angle with a angle limitation when the predetermined time is achieved;
    returning to execute the step of driving each of the plurality of motors with the driving signals of the respective fixed-values for the predetermined time when any of the at least one current tilt angle is greater than the corresponding angle limitation; and
    determining the open feedback scheme achieves the predetermined condition when all of the at least one current tilt angle are not greater than the respective angle limitations.

17. The hover-control method according to claim 16, wherein each of the driving signals is approximately equal to 11V when the multirotor UAV is in a stable hovering state, and wherein the step of driving the plurality of motors with the plurality of driving signals of the respective fixed-values for the predetermined time comprises:
    driving a motor at an uppermost position among the positions of the plurality of motors with a driving signal less than 11V of the plurality of driving signals;
    driving a motor at a lowermost position among the positions of the plurality of motors with a driving signal greater than 11V of the plurality of driving signals; and
    driving two motors at middle positions among the positions of the plurality of motors with a driving signal approximately equaling to 11V of the plurality of driving signals.

18. The hover-control method according to claim 16, wherein each of the driving signals is approximately equal to 11V when the multirotor UAV is in a stable hovering state, and wherein the step of driving the plurality of motors with the plurality of driving signals of the respective fixed-values for the predetermined time comprises:

driving two motors at an uppermost positions among the positions of the plurality of motors with two driving signals which are less than 11V and have the same value of the plurality of driving signals; and driving two motors at lowermost positions among the positions of the plurality of motors with two driving signals which are greater than 11V and have the same value of the plurality of driving signals.

19. The hover-control method according to claim 16, wherein each of the driving signals is approximately equal to 11V when the multirotor UAV is in a stable hovering state, and wherein the step of driving the plurality of motors to operate for the predetermined time by the plurality of driving signals of the respective fixed-values comprises:

driving a motor at an uppermost position among the positions and a motor closed to the motor at the uppermost position among the positions of the plurality of motors with two driving signals which are less than 11V and have different values of the plurality of driving signals; and driving a motor at a lowermost position among the positions and a motor closed to the motor at the lowermost position among the positions of the plurality of motors with two driving signals which are greater than 11V and have different values of the plurality of driving signals.

20. The hover-control method according to claim 3, wherein the step of driving the plurality of motors of the mutlirotor UAV by the negative feedback scheme comprises:

outputting a plurality of driving signals according to the at least one tilt angle with a proportional-integral-derivative (PID) control technology, wherein each of the plurality of driving signals is changed along with the change of the at least one tilt angle; and driving the plurality of motors by the driving signals, respectively.

21. A non-transitory computer readable storage medium comprising at least one program instruction, wherein the at least one program instruction is loaded and executed by a multirotor unmanned aerial vehicle (UAV) to cause the multirotor unmanned aerial vehicle to implement a hover-control method for the multirotor UAV which has been projected upwardly by an external force in an upcast state, the hover-control method comprises:

sensing the upcast state of the multirotor UAV by an inertia sensing unit;

sensing a tilt angle of at least one shaft of the multirotor UAV at a highest position by the inertia sensing unit when the multirotor UAV is in the upcast state; and driving, by a processor, a plurality of motors of the multirotor UAV by a dual feedback scheme based on a determination of whether the tilt angle of the at least one shaft of the multirotor UAV at the highest position is greater than a corresponding angle limitation to make the UAV hover, wherein the dual feedback scheme includes an open feedback scheme and a negative feedback scheme.

22. A multirotor unmanned aerial vehicle (UAV) which has been projected upwardly by an external force in an upcast state, comprising:

a plurality of motors;

a plurality of electronic speed controllers, coupled to the plurality of motors, for driving the plurality of motors according to a plurality of driving signals;

an inertia sensing unit, for measuring an acceleration speed and an angular speed; and a processing unit that includes a processor, coupled to the plurality of electronic speed controllers and the inertia sensing unit, for determining if the multirotor UAV is in the upcast state according to the acceleration speed, wherein when the multirotor UAV is in the upcast state, the processing unit calculates at least one tilt angle of at least one shaft of the multirotor UAV according to the acceleration speed and the angular speed and executes an open feedback scheme according to the at least one tilt angle, drives the plurality of motors by a dual feedback scheme based on a determination whether the tilt angle of the at least one shaft of the multirotor UAV at the highest position is greater than a corresponding angle limitation, to cause the multirotor UAV hover, wherein the dual feedback scheme includes an open feedback scheme and a negative feedback scheme.

23. The multirotor UAV according to claim 22, wherein the processing unit determines the multirotor UAV is in the upcast state when the acceleration speed is negative.

24. The multirotor UAV according to claim 22, wherein the processing unit drives the plurality of motors of the multirotor UAV by the open feedback scheme until a predetermined condition is achieved when any of the at least one tilt angle is greater than the corresponding angle limitation, and wherein the processing unit drives the plurality of motors of the multirotor UAV by the negative feedback scheme until a hover condition is achieved when all of the at least one tilt angle are not greater than the corresponding angle limitations.

25. The multirotor UAV according to claim 24, wherein the predetermined condition is a predetermined time, and wherein the processing unit obtains relative position of each of the plurality of motors according to the acceleration speed and drives each of the plurality of motors with a driving signal of a fixed-value corresponding to the relative position of the motor of the plurality of driving signal by the open feedback scheme for the predetermined time.

26. The multirotor UAV according to claim 24, wherein the processing unit obtains relative position of each of the plurality of motors according to the acceleration speed, drives each of the plurality of motors with a driving signal of a fixed value corresponding to the relative position of the motor of the plurality of driving signal by the open feedback scheme for a predetermined time, calculates at least one current tilt angle of the at least one shaft of the multirotor UAV and determines if the at least one current tilt angle is greater than respective angle limitation when the predetermined time is achieved, returns to execute the step of driving each of the plurality of motors with the driving signal of the fixed-value corresponding to the relative position of the motor of the plurality of driving signal by the open feedback scheme for a predetermined time when any of the at least one current tilt angle is greater than the corresponding angle limitation, and determines the open feedback scheme achieves the predetermined condition when all of the at least one current tilt angle are not greater than the respective angle limitations.

27. The multirotor UAV according to claim 24, wherein in the negative feedback scheme, the processing unit outputs the plurality of driving signals according to the at least one tilt angle by using a proportional-integral-derivative (PID) control, and each of the driving signals is changed along with the change of the at least one tilt angle.

28. The multirotor UAV according to claim 22, wherein in the open feedback scheme, the processing unit decreases rotation speed of a motor at an uppermost position among the positions of the plurality of motors, increases rotation speed of a motor at lowermost position among the positions of the plurality of motors, and retains rotation speeds of two motors at middle positions among the positions of the plurality of motors.

29. The multirotor UAV according to claim 22, wherein in the open feedback scheme, the processing unit decreases rotation speeds of two motors at uppermost positions among the positions of the plurality of motors by the same value and increases rotation speeds of two motors at lowermost positions among the positions of the plurality of motors by the same value.

30. The multirotor UAV according to claim 22, wherein in the open feedback scheme, the processing unit decreases rotation speeds of a motor at an uppermost position among the positions and a motor closed to the motor at the uppermost position among the positions of the plurality of motors by different values, and increases rotation speeds of a motor at a lowermost position among the positions and a motor closed to the motor at the lowermost position among the positions of the plurality of motors by different values.

31. The multirotor UAV according to claim 22, wherein each of the plurality of driving signals is approximately equal to 11V when the multirotor UAV is in a stable hovering state, and in the open feedback scheme, the processing unit drives a motor at an uppermost position among the positions of the plurality of motors with a driving signal less than 11V of the plurality of driving signals, drives a motor at a lowermost position among the positions of the plurality of motors with a driving signal greater than 11V of the plurality of driving signals, and drives two motors at middle positions among the positions of the plurality of motors with two driving signal approximately equaling to 11V of the plurality of driving signals.

32. The multirotor UAV according to claim 22, wherein each of the plurality of driving signals is approximately equal to 11V when the multirotor UAV is in a stable hovering state, and in the open feedback scheme, the processing unit drives two motors at two uppermost positions among the positions of the plurality of motors with two driving signals which are less than 11V and have the same value of the plurality of driving signals, and the processing unit drives the two motors at two lowermost positions among the positions of the plurality of motors with two driving signals which are greater than 11V and have the same value of the plurality of driving signals.

33. The multirotor UAV according to claim 22, wherein each of the plurality of driving signals is approximately equal to 11V when the multirotor UAV is in a stable hovering state, and in the open feedback scheme, the processing unit drives a motor at an uppermost position among the positions and a motor closed to the motor at the uppermost position among the positions of the plurality of motors with two driving signals which are less than 11V and have different values of the plurality of driving signals, and drives a motor at a lowermost position among the positions and a motor closed to the motor at the lowermost position among the positions of the plurality of motors with two driving signals which are greater than 11V and have different values of the plurality of driving signals.

* * * * *